US011206587B2

(12) United States Patent
Bansal et al.

(10) Patent No.: US 11,206,587 B2
(45) Date of Patent: Dec. 21, 2021

(54) CELL SELECTION FOR IN-VEHICLE EMERGENCY CALL SERVICES

(71) Applicant: QUALCOMM Incorporated, San Diego, CA (US)

(72) Inventors: Hargovind Prasad Bansal, Hyderabad (IN); Rishika Tindola, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 217 days.

(21) Appl. No.: 16/682,883

(22) Filed: Nov. 13, 2019

(65) Prior Publication Data

US 2021/0144603 A1 May 13, 2021

(51) Int. Cl.
*H04W 4/00* (2018.01)
*H04W 36/00* (2009.01)
*H04W 4/48* (2018.01)
*H04W 4/90* (2018.01)

(52) U.S. Cl.
CPC ....... *H04W 36/00835* (2018.08); *H04W 4/48* (2018.02); *H04W 4/90* (2018.02); *H04W 36/0085* (2018.08)

(58) Field of Classification Search
CPC .......... H04W 4/40; H04W 4/42; H04W 4/44; H04W 4/46; H04W 4/48; H04W 4/90; H04W 36/0083; H04W 38/0085; H04W 76/50
See application file for complete search history.

(56) References Cited

U.S. PATENT DOCUMENTS

| 2008/0227447 A1* | 9/2008 | Jeong | H04W 48/10 |
| | | | 455/434 |
| 2010/0002883 A1* | 1/2010 | Sammour | H04L 63/1416 |
| | | | 380/272 |
| 2019/0223057 A1* | 7/2019 | Park | H04W 36/08 |

OTHER PUBLICATIONS

Catt: "Issues about Inter-Carrier Configuration", 3GPP TSG-RAN WG2 Meeting #97bis, 3GPP Draft; R2-1702913—Issues About Inter-Carrier Configuration, 3rd Generation Partnership Project (3GPP), Mobile Competence Centre; 650, Route Des Lucioles; F-06921 Sophia-Antipolis Cedex; France vol. RAN WG2, No. Spokane, USA; Apr. 3, 2017-Apr. 7, 2017, Apr. 3, 2017 (Apr. 3, 2017), 2 Pages, XP051244891, Retrieved from the Internet: URL: http://www.3gpp.org/ftp/Meetings3GPP_SYNC/RAN2/Docs/ [retrieved on Apr. 3, 2017] The Whole Document.
International Search Report and Written Opinion—PCT/US2020/060598—ISA/EPO—dated Mar. 16, 2021.

* cited by examiner

*Primary Examiner* — Matthew W Genack
(74) *Attorney, Agent, or Firm* — Harrity & Harrity\Qualcomm (57) ABSTRACT

Various aspects of the present disclosure generally relate to wireless communication. In some aspects, a wireless device, such as an in-vehicle device, may determine a selection value for a cell that indicates a priority for selection of the cell by the wireless device and calculates, from the selection value, an adjusted selection value for the cell using an offset that increases a priority of selection for cells that support in-vehicle emergency calls. The wireless device selectively selects the cell based at least in part on the adjusted selection value. Numerous other aspects are provided.

30 Claims, 7 Drawing Sheets

CELL SELECTION FOR IN-VEHICLE EMERGENCY CALL SERVICES

FIELD OF THE DISCLOSURE

Aspects of the present disclosure generally relate to wireless communication and particularly to techniques and apparatuses for selecting cells for in-vehicle emergency call services.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a wireless device, may include determining a selection value for a cell that indicates a priority for selection of the cell by the wireless device and calculating, from the selection value, an adjusted selection value for the cell using an offset that increases a priority of selection for cells that support in-vehicle emergency calls. The method may include selectively selecting the cell based at least in part on the adjusted selection value.

In some aspects, a wireless device for wireless communication may include memory and one or more processors operatively coupled to the memory. The memory and the one or more processors may be configured to determine a selection value for a cell that indicates a priority for selection of the cell by the wireless device and calculate, from the selection value, an adjusted selection value for the cell using an offset that increases a priority of selection for cells that support in-vehicle emergency calls. The memory and the one or more processors may be configured to selectively select the cell based at least in part on the adjusted selection value.

In some aspects, an apparatus for wireless communication may include means for determining a selection value for a cell that indicates a priority for selection of the cell by the apparatus and means for calculating, from the selection value, an adjusted selection value for the cell using an offset that increases a priority of selection for cells that support in-vehicle emergency calls. The apparatus may include means for selectively selecting the cell based at least in part on the adjusted selection value.

In some aspects, a method of wireless communication, performed by a network device, may include determining an offset in order to one or more of: increase a priority, for selection by a wireless device, of a cell that supports in-vehicle emergency calls, or adjust a threshold for initiating measurement of neighboring cells based at least in part on whether a serving cell supports in-vehicle emergency calls. The method may include providing the offset to the wireless device.

In some aspects, a network device for wireless communication may include memory and one or more processors operatively coupled to the memory. The memory and the one or more processors may be configured to determine an offset in order to one or more of: increase a priority, for selection by a wireless device, of a cell that supports in-vehicle emergency calls, or adjust a threshold for initiating measurement of neighboring cells based at least in part on whether a serving cell supports in-vehicle emergency calls. The memory and the one or more processors may be configured to provide the offset to the wireless device.

In some aspects, a non-transitory computer-readable medium may store one or more instructions for wireless communication. The one or more instructions, when executed by one or more processors of a network device, may cause the one or more processors to determine an offset in order to one or more of: increase a priority, for selection by a wireless device, of a cell that supports in-vehicle emergency calls, or adjust a threshold for initiating measurement of neighboring cells based at least in part on whether a serving cell supports in-vehicle emergency calls. The one or more instructions, when executed by the one or more processors of the network device, provide the offset to the wireless device.

In some aspects, an apparatus for wireless communication may include means for determining an offset in order to one or more of: increase a priority, for selection by a wireless device, of a cell that supports in-vehicle emergency calls, or adjust a threshold for initiating measurement of neighboring cells based at least in part on whether a serving cell supports in-vehicle emergency calls. The apparatus may include means for providing the offset to the wireless device.

Aspects generally include a method, apparatus, system, computer program product, non-transitory computer-readable medium, user equipment, network device, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
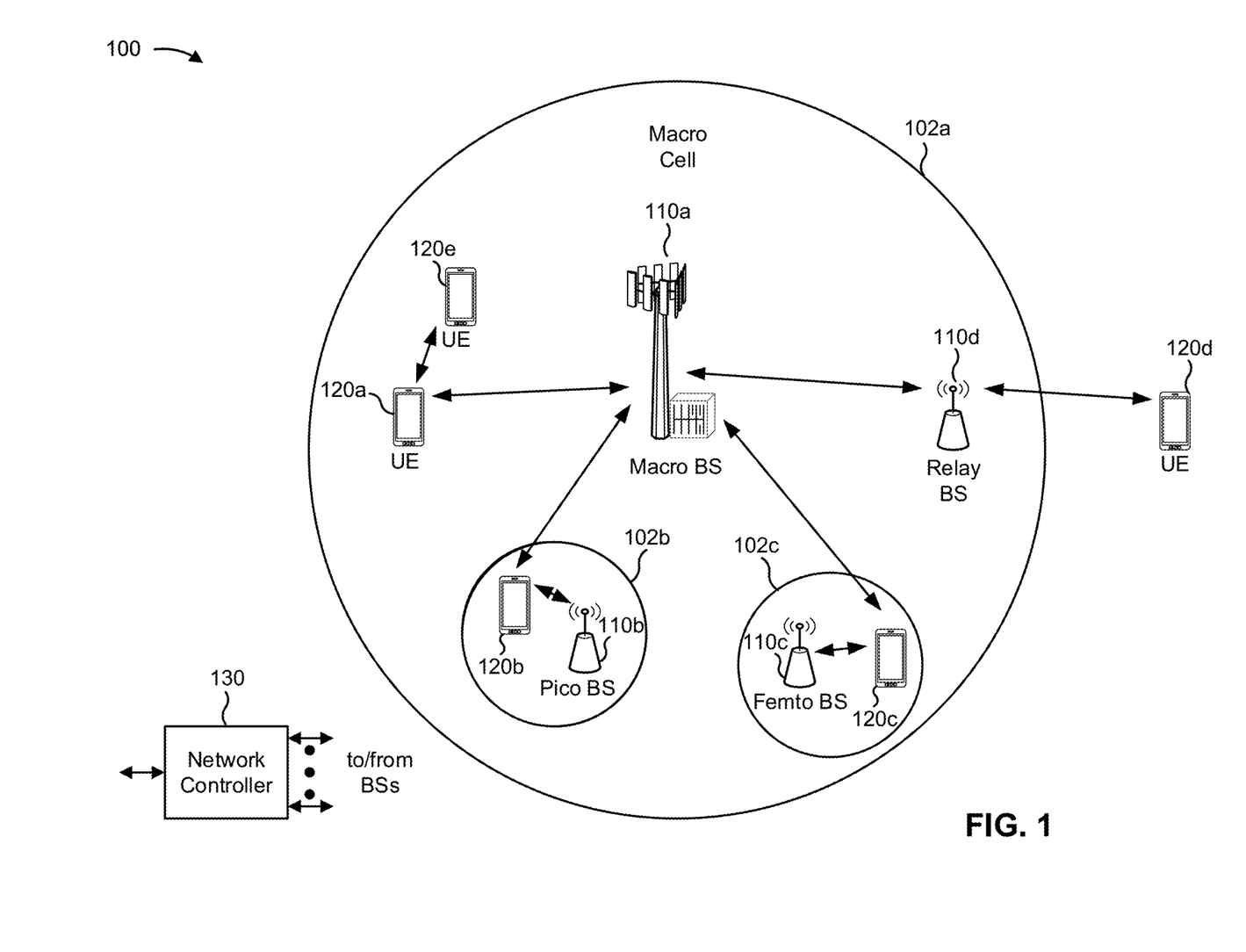
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
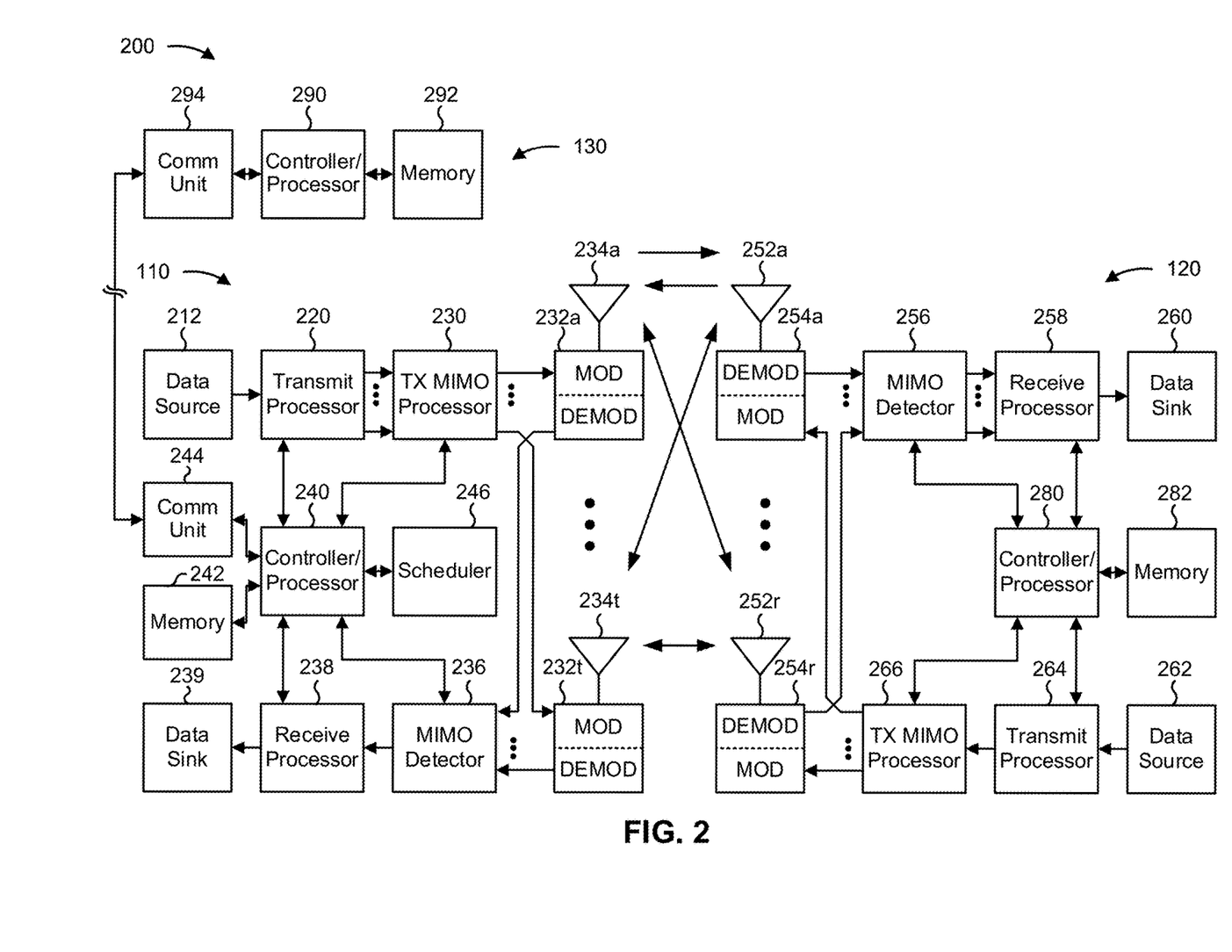
FIG. 2 is a block diagram conceptually illustrating an example of a network device, such as a base station, in communication with a wireless device, such as a user equipment (UE), in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with selecting cells for in-vehicle emergency call services, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 600 of FIG. 6, process 700 of FIG. 7, and/or other processes as described herein. A scheduler 246 may schedule UEs for data transmission on the downlink and/or uplink.

In some aspects, a wireless device (e.g., UE 120) may include means for determining a selection value for a cell that indicates a priority for selection of the cell by the wireless device, means for calculating, from the selection value, an adjusted selection value for the cell using an offset that increases a priority of selection for cells that support in-vehicle emergency calls, means for selectively selecting the cell based at least in part on the adjusted selection value, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a network device (e.g., base station 110) may include means for determining an offset in order to one or more of: increase a priority, for selection by a wireless device, of a cell that supports in-vehicle emergency calls, or adjust a threshold for initiating measurement of neighboring cells based at least in part on whether a serving cell supports in-vehicle emergency calls, means for providing the offset to the wireless device, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

A vehicle may be fitted with a wireless device (referred to as an in-vehicle device) that is configured to share vehicle-related information with an emergency call service (sometimes referred to as an "eCall" service). The vehicle-related information may include airbag deployment information, impact sensor information, location information, vehicle identification information, passenger information, and/or the like. If the vehicle is involved in a crash, the in-vehicle device may automatically make an emergency call to the emergency call service and provide the vehicle-related information. The vehicle-related information may bring quicker assistance to passengers in the vehicle. For example, emergency first responders may know a location of the vehicle, a seriousness of the crash, how many passengers are in the vehicle, which airbags deployed, a direction and magnitude of impact, and/or the like. The emergency call will not be handled like a normal telephone call. Instead, the vehicle-related information in the emergency call will reach the emergency call service through a cell that supports in-vehicle emergency calls.

Many, but not all, cells support in-vehicle emergency calls, or are technically capable of receiving vehicle-related information in an automatic emergency call. If an in-vehicle device is able to connect to a cell that supports in-vehicle emergency calls, but is connected to a different (serving) cell that has a higher selection value due to its signal strength, the in-vehicle device will not be able to send vehicle-related information to the emergency call service if the vehicle is involved in a crash. That is, the in-vehicle device may be configured to send the vehicle-related information, but the serving cell is not capable of receiving the vehicle-related information in an automatic emergency call and relaying the vehicle-related information to the emergency call service.

As a result, there may be a longer delay before emergency first responders will be alerted to the crash than if the serving cell did support in-vehicle emergency calls. The emergency first responders may also not receive the vehicle-related information. The longer delay and/or lack of vehicle-related information may lead to a loss of life.

In some aspects described herein, a network device, such as a base station or radio network controller, may enable a wireless device, such as an in-vehicle device of a vehicle, to have a better chance of being connected to a cell that supports in-vehicle emergency calls, in case the vehicle is involved in a crash. The network device may provide an offset that the in-vehicle device may use to calculate a priority of a cell for selection. The in-vehicle device may use the offset to bias for selection of, or increase a priority of, cells that support in-vehicle emergency calls. The in-vehicle device may increase a chance that the in-vehicle device will remain with or select a cell that supports in-vehicle emergency calls, even though the cell would normally have a lesser priority for selection without the offset. As a result, if the vehicle is involved in a crash, the in-vehicle device may send vehicle-related information in an automatic emergency call and a base station of the cell receiving the automatic emergency call will be technically able to receive and relay the vehicle-related information to the emergency call service. Emergency first responders may reach passengers of the vehicle sooner and more lives may be saved. Additionally, or alternatively, traffic around an accident may be affected less or diverted sooner.

Figure 3:
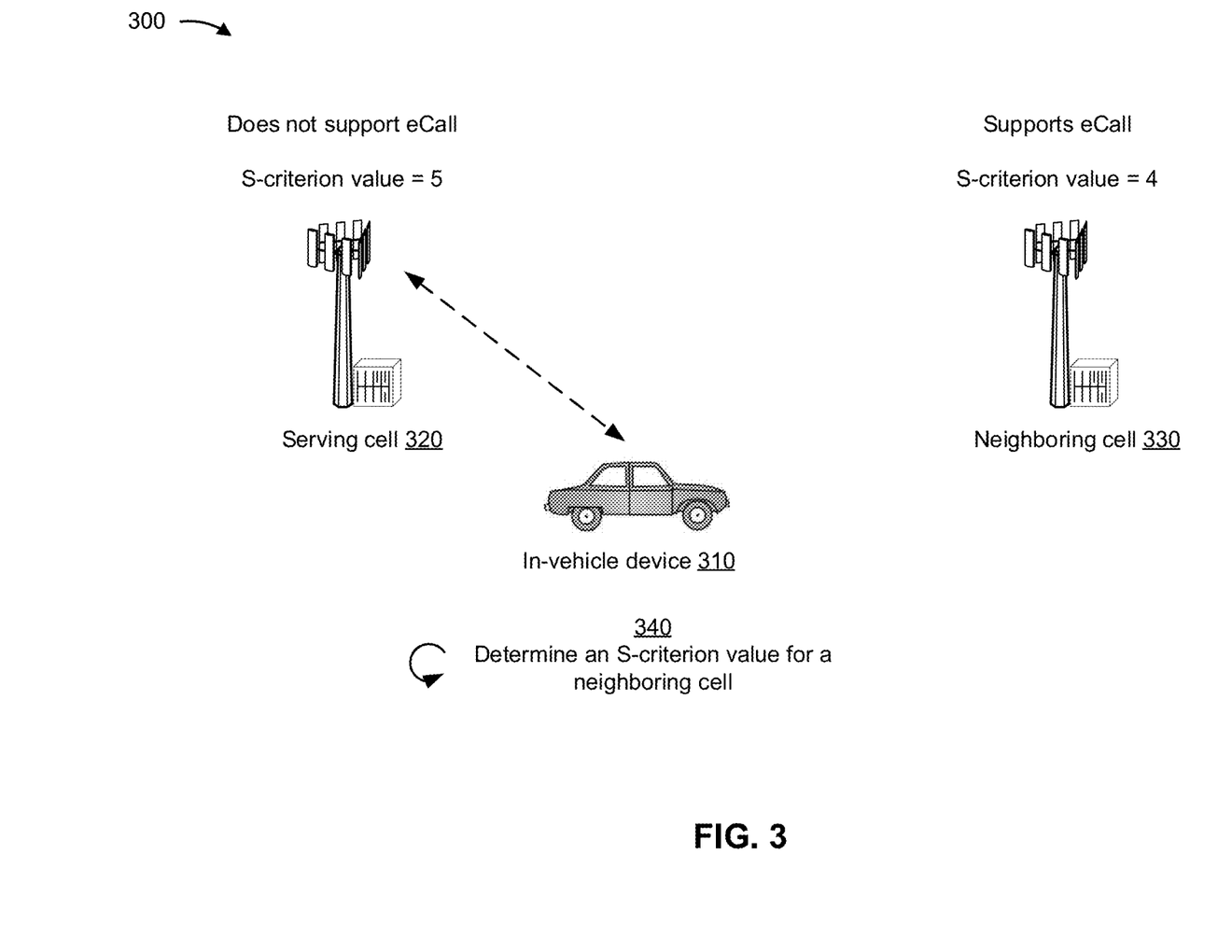
FIG. 3 is a diagram illustrating an example of selecting a cell for in-vehicle emergency call services, in accordance with various aspects of the present disclosure.

FIG. 3 is a diagram illustrating an example 300 of selecting a cell for in-vehicle emergency call services, in accordance with various aspects of the present disclosure. FIG. 3 illustrates a vehicle fitted with a wireless device (e.g., in-vehicle device 310) that may select serving cell 320 or neighboring cell 330 for wireless communication.

In-vehicle device 310 may be configured to make an emergency call and provide vehicle-related information to an emergency call service in case of an emergency, such as a crash. The emergency call may be referred to as an "eCall" and in-vehicle device 310 may be part of a government or company initiative that deploys in-vehicle devices that are configured to automatically send vehicle-related information in an emergency call. The emergency call and vehicle-related information may be relayed to the emergency call service by a network device, such as a base station providing a cell that supports in-vehicle emergency calls. Serving cell 320 and neighboring cell 330 represent cells provided by base stations. In this example, serving cell 320 does not support in-vehicle emergency calls and neighboring cell 330 does support in-vehicle emergency calls. In-vehicle device 310 is currently connected to or camped on serving cell 320.

Serving cell 320 and neighboring cell 330 may each have a measure of suitability for serving in-vehicle device 310. The measure of suitability may correspond to a priority of cell selection and may be due to a strength or quality of communications that a cell may provide to in-vehicle device 310. The measure of suitability may be represented by a selection value, such as an S-criterion value. A higher selection value may represent a higher priority for cell selection by in-vehicle device 310. As shown by example 300 in FIG. 3, serving cell 320 has an S-criterion value of 5, which is higher than an S-criterion value of 4 for neighboring cell 330. However, serving cell 320 does not support in-vehicle emergency calls and in-vehicle device 310 is connected to (or camped on) serving cell 320. Consequently, the vehicle is at risk for a longer response time from emergency first responders if the vehicle were to crash.

In-vehicle device 310 is configured to send vehicle-related information, but such functionality for in-vehicle emergency calls is wasted if serving cell 320 is not configured to receive and relay vehicle-related information in an emergency call to the emergency call service.

In some aspects, as shown by reference number 340, in-vehicle device 310 may determine a selection value (e.g., S-criterion value) for a cell, such as for serving cell 320 and/or for neighboring cell 330. For example, an S-criterion value for serving cell 320 may be 5, and an S-criterion value for neighboring cell 330 may be 4. As serving cell 320 has a higher selection value than neighboring cell 330, it would be expected that in-vehicle device 310 would remain connected to serving cell 320, which does not support in-vehicle emergency calls.

As indicated above, FIG. 3 is provided as an example. Other examples may differ from what is described with regard to FIG. 3.

Figure 4:
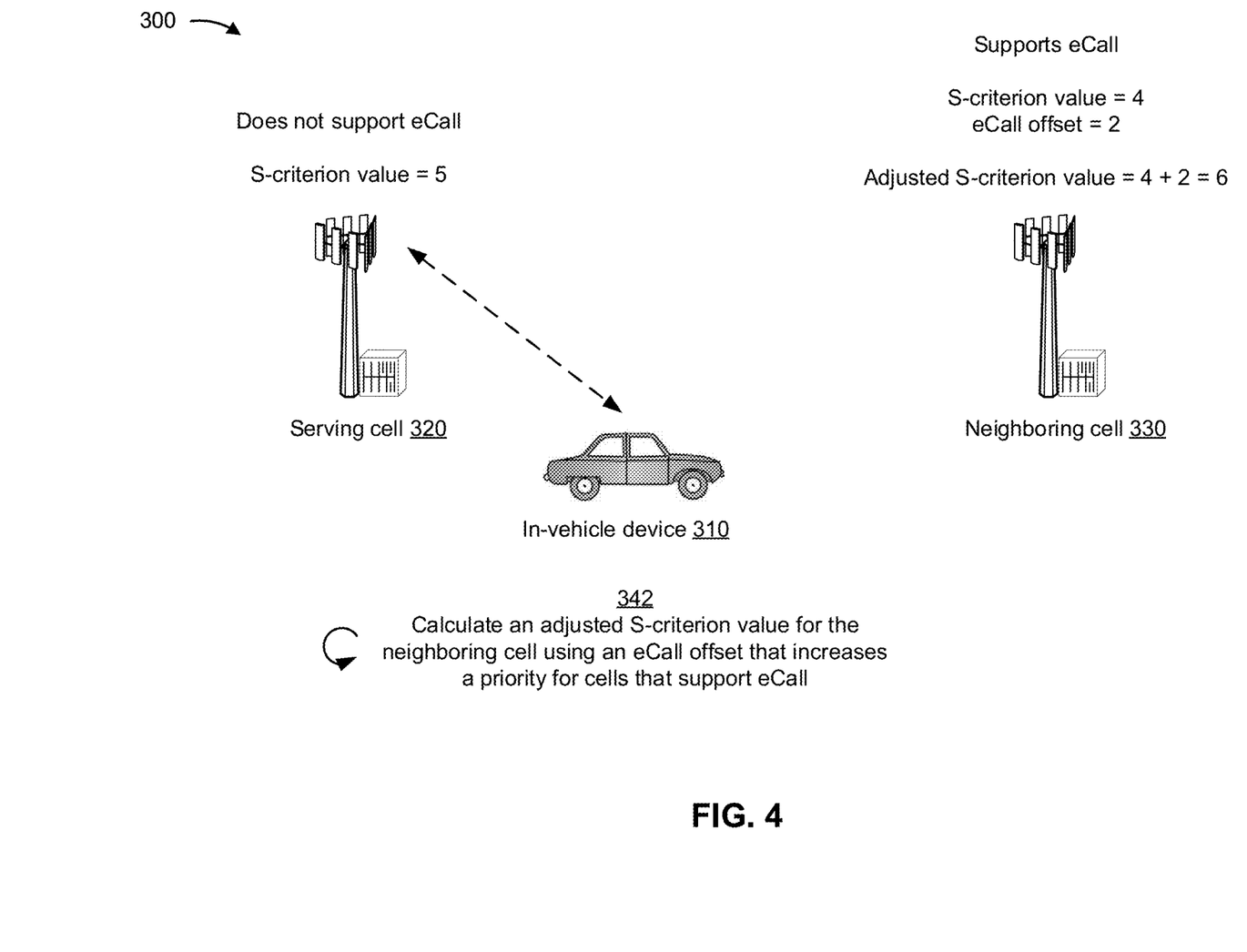
FIG. 4 is a diagram further illustrating the example of selecting a cell for in-vehicle emergency call services, in accordance with various aspects of the present disclosure.

FIG. 4 is a diagram further illustrating the example of selecting a cell for in-vehicle emergency call services, in accordance with various aspects of the present disclosure.

In some aspects, as shown by reference number 342, in-vehicle device 310 may calculate an adjusted selection value for neighboring cell 330 using an offset that increases a priority for cells that support in-vehicle emergency calls. The offset may be referred to as an eCall offset and may be received from a network device. In example 300, the eCall offset is a value of 2 and the eCall offset may increase a selection value by 2 for a cell that supports in-vehicle emergency calls. Accordingly, in-vehicle device 310 may increase the selection value for neighboring cell 330 by 2 to arrive at the adjusted selection value of 6 for neighboring cell 330. The adjusted selection value for neighboring cell 330 is now higher than the selection value of serving cell 320. Neighboring cell 330 now has a higher priority for selection for in-vehicle device 310 than serving cell 320.

Example 300 illustrated by FIGS. 3 and 4 involve a positive value of 2 for an eCall offset. In some aspects, the eCall offset may be a negative value and in-vehicle device 310 may lower a selection value for a cell that does not support in-vehicle emergency calls. Example 300 is only one example of an offset adjusting a priority of a cell for selection. In-vehicle device 310 may perform other calculations where an offset in some way increases or decreases a priority of selection for a cell. The offset may be a factor for addition, subtraction, multiplication, division, some other manner of adjusting a calculation of a selection value or comparative priority value, and/or the like.

As indicated above, FIG. 4 is provided as an example. Other examples may differ from what is described with regard to FIG. 4.

Figure 5:
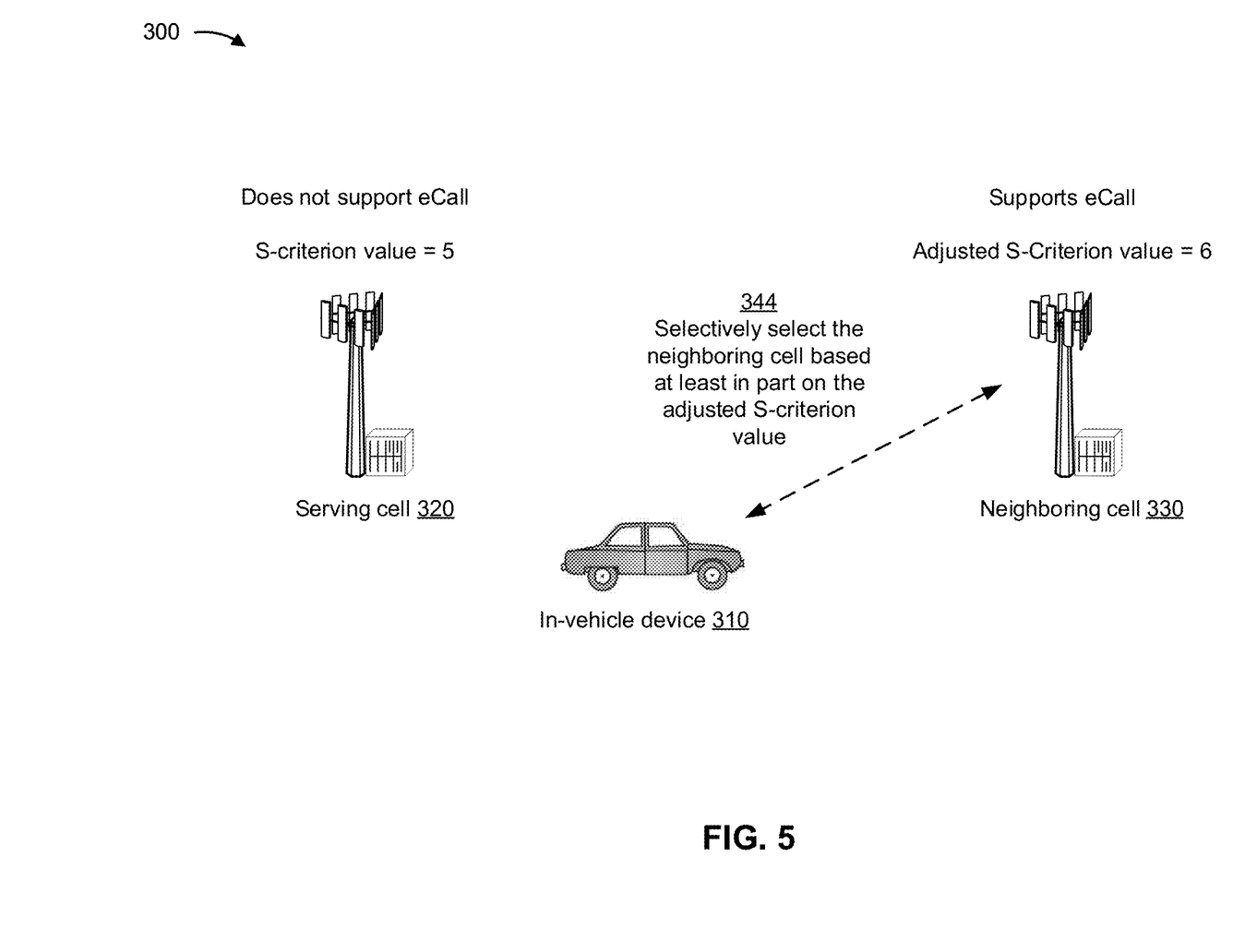
FIG. 5 is a diagram further illustrating the example of selecting a cell for in-vehicle emergency call services, in accordance with various aspects of the present disclosure.

FIG. 5 is a diagram further illustrating the example of selecting a cell for in-vehicle emergency call services, in accordance with various aspects of the present disclosure.

In-vehicle device 310 may determine that the adjusted selection value (of 6) for neighboring cell 330 indicates a higher priority for cell selection than the selection value (of 5) for serving cell 320. Therefore, as shown by reference number 344, in-vehicle device 310 may selectively select, based at least in part on the adjusted selection value of neighboring cell 330, to connect to neighboring cell 330. In-vehicle device 310 may proceed with switching to neighboring cell 330. In some aspects, if in-vehicle device 310 is in an idle mode, in-vehicle device 310 may reselect to neighboring cell 330. In some aspects, if in-vehicle device 310 is in connected mode, serving cell 320 may hand over in-vehicle device 310 to neighboring cell 330.

In example 300 illustrated by FIGS. 3-5, serving cell 320 does not support in-vehicle emergency calls and neighboring cell 330 does support in-vehicle emergency calls. In another scenario, serving cell 320 does support in-vehicle emergency calls and neighboring cell 330 does not. In-vehicle device 310 may use an offset in order to increase the selection value of serving cell 320 and thus a probability of remaining connected to (or camped on) serving cell 320. Additionally, or alternatively, in-vehicle device 310 may use the offset to decrease a selection value and priority of neighboring cell 330.

In some aspects, in-vehicle device 310 may consider a minimum threshold for a selection value for selecting a cell. This is because a serving cell has to have some reasonable expectation of service quality. For example, if the selection value of neighboring cell 330 in FIG. 3 does not satisfy the minimum threshold for a selection value (e.g., S-criterion is 0), even a larger offset may not qualify neighboring cell 330 for selection. In-vehicle device 310 may not connect to a cell that does not meet a minimum threshold for a selection value, even if the cell supports in-vehicle emergency calls.

Additionally, or alternatively, in-vehicle device 310 may initiate measurement of neighboring cells if in-vehicle device 310 determines that a signal quality or signal strength of a serving cell is not sufficient or if other factors (e.g., intermittent service, interference, and/or the like) cause in-vehicle device 310 to reconsider remaining with the serving cell. In-vehicle device 310 may initiate measurement of neighboring cells if a threshold for initiating measurement is satisfied. For example, if a signal strength for communications using serving cell 320 drops below a certain signal strength threshold, in-vehicle device 310 may determine that a threshold for initiating measurement is satisfied and will proceed with initiating measurements of neighboring cells to determine if in-vehicle device 310 is to connect to another cell.

In some aspects, in-vehicle device 310 may adjust, based at least in part on the offset, the threshold for initiating measurement of neighboring cells. For example, if serving cell 320 supports in-vehicle emergency calls, in-vehicle device 310 may use the offset to increase an amount of time before initiating measurement of the neighboring cells. In another example, if serving cell 320 does not support in-vehicle emergency calls, in-vehicle device 310 may use the offset to decrease an amount of time before initiating measurement of the neighboring cells.

In some aspects, a network device, such as serving cell 320 or a radio network controller, may determine an offset in order to one or more of increase a priority of selection for cells that support in-vehicle emergency calls or adjust a threshold for initiating measurement of neighboring cells. The network device may provide the offset to an in-vehicle device, such as in a measurement message. In some aspects, the network device may determine the offset based at least in part on information about the serving cell, information from a minimization of drive test (MDT), and or the like.

Additionally, or alternatively, the network device may cause in-vehicle device 310 to reselect or hand over in-vehicle device 310 from a serving cell that supports in-vehicle emergency calls to a neighboring cell that does not support in-vehicle emergency calls, only if a difference in a selection value of the serving cell and a selection value of the neighboring cell satisfies a threshold. For example, if serving cell 320 supports in-vehicle emergency calls and neighboring cell 330 does not, and if conditions at serving cell 320 have lowered its suitability for connection and thus lowered its selection value with respect to a selection value of neighboring cell 330, the network device will not cause in-vehicle device 310 to reselect to neighboring cell 330 or hand over in-vehicle device 310 to neighboring cell 330 unless a difference between the selection value of serving cell 320 and the selection value of neighboring cell 330 satisfies a respective reselection threshold or handover threshold. For example, the selection value of serving cell 320 may have dropped to 4 (even with the offset) compared to a previous value of 6. The selection value of neighboring cell 330 may be 5. The network device may not cause in-vehicle device 310 to reselect to neighboring cell 330 unless the difference between the selection value of serving cell 320 and the selection value of neighboring cell 330 reaches a threshold of 3 (where the selection value of serving cell 320 reaches a selection value of 2). Additionally or alternatively, selection value comparisons involving a reselection threshold or a handover threshold may vary in other ways, so as to increase a priority of selecting a cell that supports in-vehicle emergency calls that are part of a life-saving emergency call service.

Figure 6:
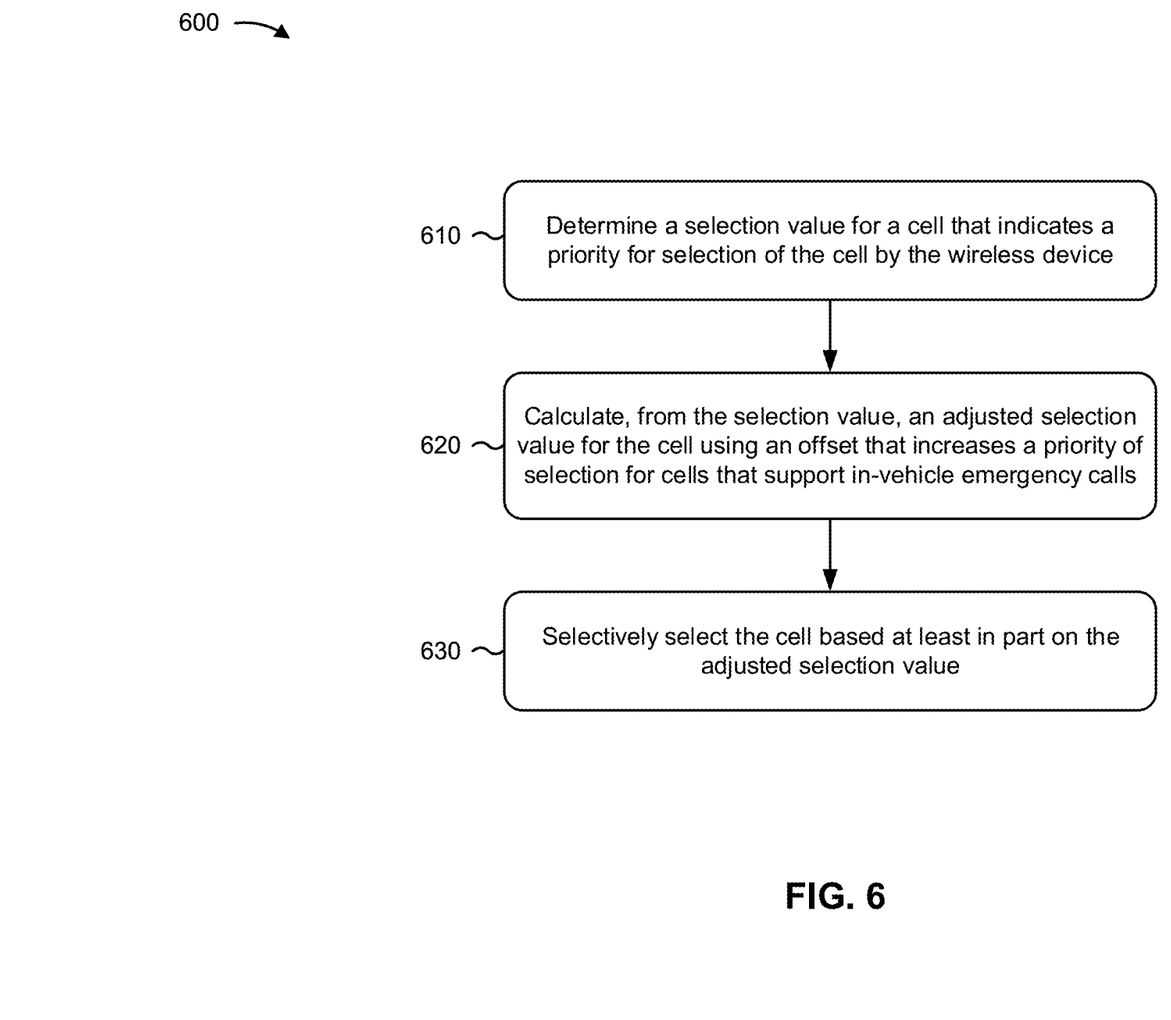
FIG. 6 is a flowchart illustrating an example process performed, for example, by a wireless device, in accordance with various aspects of the present disclosure.

FIG. 6 is a diagram illustrating an example process 600 performed, for example, by a wireless device, in accordance with various aspects of the present disclosure. Example process 600 is an example where a wireless device (e.g., in-vehicle device 310 and/or the like) performs operations associated with cell selection for in-vehicle emergency call services.

As shown in FIG. 6, in some aspects, process 600 may include determining a selection value for a cell that indicates a priority for selection of the cell by the wireless device (block 610). For example, the wireless device (e.g., using receive processor 258, transmit processor 264, controller/processor 280, memory 282, and/or the like) may determine a selection value for a cell that indicates a priority for selection of the cell by the wireless device, as described above.

As shown in FIG. 6, in some aspects, process 600 may include calculating, from the selection value, an adjusted selection value for the cell using an offset that increases a priority of selection for cells that support in-vehicle emergency calls (block 620). For example, the wireless device (e.g., using receive processor 258, transmit processor 264, controller/processor 280, memory 282, and/or the like) may calculate, from the selection value, an adjusted selection value for the cell using an offset that increases a priority of selection for cells that support in-vehicle emergency calls, as described above.

As shown in FIG. 6, in some aspects, process 600 may include selectively selecting the cell based at least in part on the adjusted selection value (block 630). For example, the wireless device (e.g., using receive processor 258, transmit processor 264, controller/processor 280, memory 282, and/or the like) may selectively select the cell based at least in part on the adjusted selection value, as described above. In some aspects, selecting the cell includes proceeding to connect to the cell.

Process 600 may include additional aspects, such as any single aspect or any combination of aspects described below and/or in connection with one or more other processes described elsewhere herein.

In a first aspect, the cell is a neighboring cell that supports in-vehicle emergency calls. In some aspects, the adjusted selection value, with respect to the selection value, increases a priority of the neighboring cell for selection.

In a second aspect, alone or in combination with the first aspect, the selection value for the neighboring cell is less than a selection value for a serving cell that does not support in-vehicle emergency calls. In some aspects, the adjusted selection value for the neighboring cell is greater than the selection value for the serving cell. In some aspects, selectively selecting the cell includes selecting the neighboring cell based at least in part on the adjusted selection value for the neighboring cell being greater than the selection value for the serving cell.

In a third aspect, alone or in combination with one or more of the first and second aspects, the cell is a neighboring cell that does not support in-vehicle emergency calls. In some aspects, the adjusted selection value, with respect to the selection value, decreases a priority of the neighboring cell for selection.

In a fourth aspect, alone or in combination with one or more of the first through third aspects, the cell is a serving cell that supports in-vehicle emergency calls. In some aspects, the adjusted selection value, with respect to the selection value, increases a probability of the wireless device remaining camped on the serving cell.

In a fifth aspect, alone or in combination with one or more of the first through fourth aspects, the cell is a serving cell that does not support in-vehicle emergency calls. In some aspects, the adjusted selection value, with respect to the selection value, decreases a probability of the wireless device remaining camped on the serving cell.

In a sixth aspect, alone or in combination with one or more of the first through fifth aspects, the cell is a serving cell that supports in-vehicle emergency calls. In some aspects, the method further comprises adjusting, based at least in part on the offset, a threshold for initiating measurement of neighboring cells, the offset being set to increase an amount of time before initiating measurement of the neighboring cells.

In a seventh aspect, alone or in combination with one or more of the first through sixth aspects, the cell is a serving cell that does not support in-vehicle emergency calls. In some aspects, the method further comprises adjusting, based at least in part on the offset, a threshold for initiating measurement of neighboring cells, the offset being set to decrease an amount of time before initiating measurement of neighboring cells.

In an eighth aspect, alone or in combination with one or more of the first through seventh aspects, selectively selecting the cell includes determining whether to select the cell based at least in part on a determination that the cell satisfies a selection value threshold.

In a ninth aspect, alone or in combination with one or more of the first through eighth aspects, process 600 further comprises receiving the offset from a network entity.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
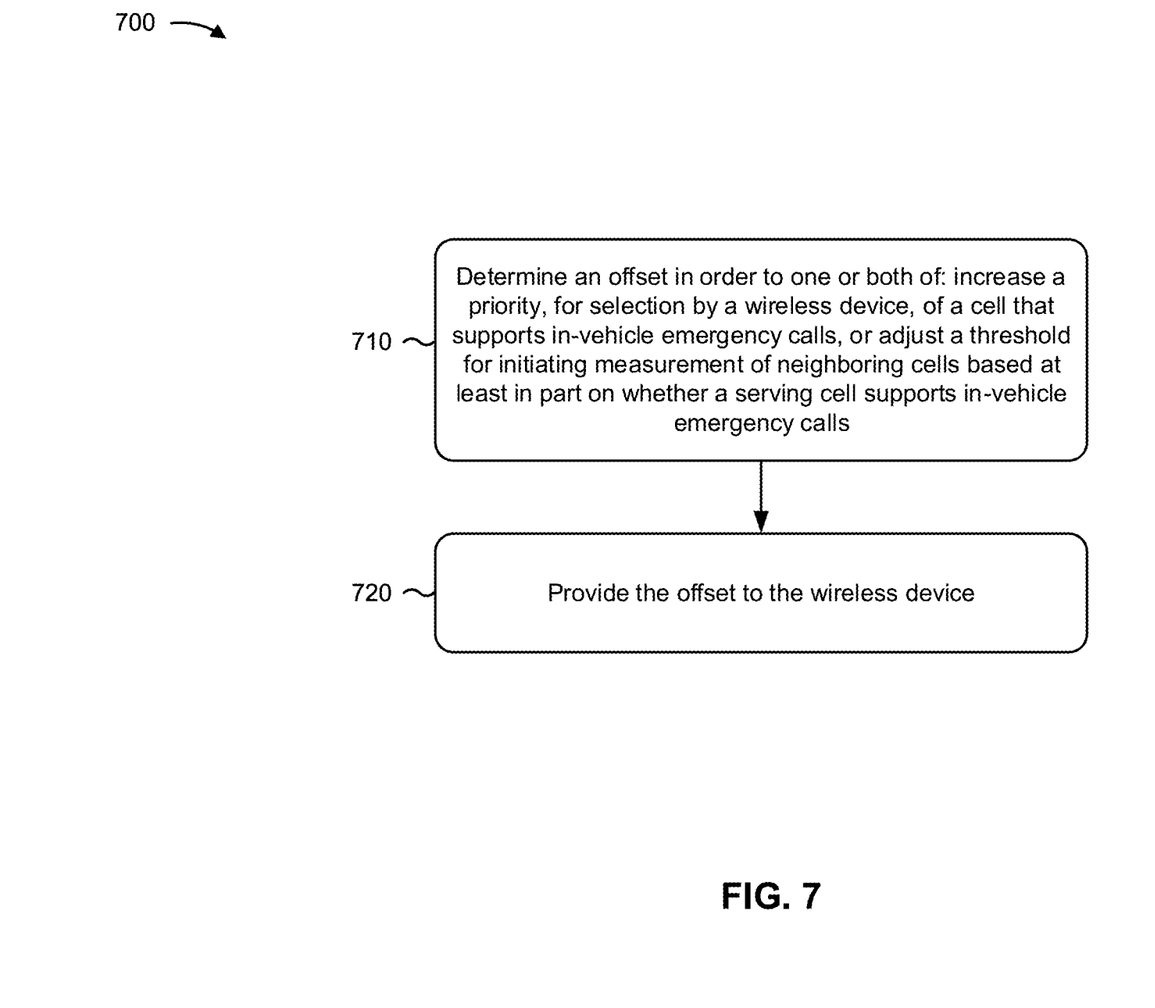
FIG. 7 is a flowchart illustrating an example process performed, for example, by a network device, in accordance with various aspects of the present disclosure.

FIG. 7 is a diagram illustrating an example process 700 performed, for example, by a network device, in accordance with various aspects of the present disclosure. Example process 700 is an example where a network device (e.g., base station for serving cell 320, base station for neighboring cell 330, and/or the like) performs operations associated with cell selection for in-vehicle emergency call services.

As shown in FIG. 7, in some aspects, process 700 may include determining an offset in order to one or more of: increase a priority, for selection by a wireless device, of a cell that supports in-vehicle emergency calls, or adjust a threshold for initiating measurement of neighboring cells based at least in part on whether a serving cell supports in-vehicle emergency calls (block 710). For example, the network device (e.g., using receive processor 258, transmit processor 264, controller/processor 280, memory 282, and/or the like) may determine an offset in order to one or more of: increase a priority, for selection by a wireless device, of a cell that supports in-vehicle emergency calls, or adjust a threshold for initiating measurement of neighboring cells based at least in part on whether a serving cell supports in-vehicle emergency calls, as described above.

As shown in FIG. 7, in some aspects, process 700 may include providing the offset to the wireless device (block 720). For example, the network device (e.g., using receive processor 258, transmit processor 264, controller/processor 280, memory 282, and/or the like) may provide the offset to the wireless device, as described above.

Process 700 may include additional aspects, such as any single aspect or any combination of aspects described below and/or in connection with one or more other processes described elsewhere herein.

In a first aspect, determining the offset includes determining the offset based at least in part on information about the serving cell, information from a minimization drive test report, or both.

In a second aspect, alone or in combination with the first aspect, providing the offset includes providing the offset in a measurement message.

In a third aspect, alone or in combination with one or more of the first and second aspects, the network device is a base station that provides a serving cell that supports in-vehicle emergency calls, and the method further comprises causing the wireless device to reselect from the serving cell to a neighbor cell that does not support in-vehicle emergency calls, based at least in part on a determination that a difference between a selection value of the serving cell and a selection value of the neighbor cell satisfies a reselection threshold.

In a fourth aspect, alone or in combination with one or more of the first through third aspects, the network device is a base station that provides a serving cell that does not support in-vehicle emergency calls, and the method further comprises causing the wireless device to reselect from the serving cell to a neighbor cell that supports in-vehicle emergency calls, based at least in part on a determination that a difference between a selection value of the serving cell and a selection value of the neighboring cell satisfies a reselection threshold.

In a fifth aspect, alone or in combination with one or more of the first through fourth aspects, the network device is a base station that provides a serving cell that supports in-vehicle emergency calls, and the method further comprises handing over the wireless device from the serving cell to a neighboring cell that does not support in-vehicle emergency calls, based at least in part on a determination that a difference between a selection value of the serving cell and a selection value of the neighbor cell satisfies a handover threshold.

In a sixth aspect, alone or in combination with one or more of the first through fifth aspects, the network device is a base station that provides a serving cell that does not support in-vehicle emergency calls, and the method further comprises handing over the wireless device from the serving cell to a neighboring cell that supports in-vehicle emergency calls, based at least in part on a determination that a difference between a selection value of the serving cell and a selection value of the neighbor cell satisfies a handover threshold.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a wireless device, comprising:
   determining a selection value for a cell that indicates a priority for selection of the cell by the wireless device;
   calculating, from the selection value, an adjusted selection value for the cell using an offset that increases a priority of selection for cells that support in-vehicle emergency calls; and
   selectively selecting the cell based at least in part on the adjusted selection value.

2. The method of claim 1, wherein the cell is a neighboring cell that supports in-vehicle emergency calls, and wherein the adjusted selection value, with respect to the selection value, increases a priority of the neighboring cell for selection.

3. The method of claim 2, wherein the selection value for the neighboring cell is less than a selection value for a serving cell that does not support in-vehicle emergency calls, wherein the adjusted selection value for the neighboring cell is greater than the selection value for the serving cell, and wherein selectively selecting the cell includes selecting the neighboring cell based at least in part on the adjusted selection value for the neighboring cell being greater than the selection value for the serving cell.

4. The method of claim 1, wherein the cell is a neighboring cell that does not support in-vehicle emergency calls, and wherein the adjusted selection value, with respect to the selection value, decreases a priority of the neighboring cell for selection.

5. The method of claim 1, wherein the cell is a serving cell that supports in-vehicle emergency calls, and wherein the adjusted selection value, with respect to the selection value, increases a probability of the wireless device remaining camped on the serving cell.

6. The method of claim 1, wherein the cell is a serving cell that does not support in-vehicle emergency calls, and wherein the adjusted selection value, with respect to the selection value, decreases a probability of the wireless device remaining camped on the serving cell.

7. The method of claim 1, wherein the cell is a serving cell that supports in-vehicle emergency calls, and wherein the method further comprises adjusting, based at least in part on the offset, a threshold for initiating measurement of neighboring cells, the offset being set to increase an amount of time before initiating measurement of the neighboring cells.

8. The method of claim 1, wherein the cell is a serving cell that does not support in-vehicle emergency calls, and wherein the method further comprises adjusting, based at least in part on the offset, a threshold for initiating measurement of neighboring cells, the offset being set to decrease an amount of time before initiating measurement of neighboring cells.

9. The method of claim 1, wherein selectively selecting the cell includes determining whether to select the cell based at least in part on a determination that the cell satisfies a selection value threshold.

10. The method of claim 1, further comprising receiving the offset from a network entity.

11. A method of wireless communication performed by a network device, comprising:
    determining an offset in order to one or more of:
       increase a priority, for selection by a wireless device, of a cell that supports in-vehicle emergency calls, or
       adjust a threshold for initiating measurement of neighboring cells based at least in part on whether a serving cell supports in-vehicle emergency calls; and
    providing the offset to the wireless device.

12. The method of claim 11, wherein determining the offset includes determining the offset based at least in part on information about the serving cell, information from a minimization drive test (MDT) report, or both.

13. The method of claim 11, wherein providing the offset includes providing the offset in a measurement message.

14. The method of claim 11, wherein the network device is a base station that provides a serving cell that supports in-vehicle emergency calls, and wherein the method further comprises causing the wireless device to reselect from the serving cell to a neighbor cell that does not support in-vehicle emergency calls, based at least in part on a determination that a difference between a selection value of the serving cell and a selection value of the neighbor cell satisfies a reselection threshold.

15. The method of claim 11, wherein the network device is a base station that provides a serving cell that does not support in-vehicle emergency calls, and wherein the method further comprises causing the wireless device to reselect from the serving cell to a neighbor cell that supports in-vehicle emergency calls, based at least in part on a determination that a difference between a selection value of the serving cell and a selection value of the neighboring cell satisfies a reselection threshold.

16. The method of claim 11, wherein the network device is a base station that provides a serving cell that supports in-vehicle emergency calls, and wherein the method further comprises handing over the wireless device from the serving cell to a neighboring cell that does not support in-vehicle emergency calls, based at least in part on a determination that a difference between a selection value of the serving cell and a selection value of the neighbor cell satisfies a handover threshold.

17. The method of claim 11, wherein the network device is a base station that provides a serving cell that does not support in-vehicle emergency calls, and wherein the method further comprises handing over the wireless device from the serving cell to a neighboring cell that supports in-vehicle emergency calls, based at least in part on a determination that a difference between a selection value of the serving cell and a selection value of the neighbor cell satisfies a handover threshold.

18. A wireless device for wireless communication, comprising:
  a memory; and
  one or more processors, operatively coupled to the memory, the memory and the one or more processors configured to:
    determine a selection value for a cell that indicates a priority for selection of the cell by the wireless device;
    calculate, from the selection value, an adjusted selection value for the cell using an offset that increases a priority of selection for cells that support in-vehicle emergency calls; and
    selectively select the cell based at least in part on the adjusted selection value.

19. The wireless device of claim 18, wherein the cell is a neighboring cell that supports in-vehicle emergency calls, and wherein the adjusted selection value, with respect to the selection value, increases a priority of the neighboring cell for selection.

20. The wireless device of claim 19, wherein the selection value for the neighboring cell is less than a selection value for a serving cell that does not support in-vehicle emergency calls, wherein the adjusted selection value for the neighboring cell is greater than the selection value for the serving cell, and wherein the memory and the one or more processors are configured to select the neighboring cell based at least in part on the adjusted selection value for the neighboring cell being greater than the selection value for the serving cell.

21. The wireless device of claim 18, wherein the cell is a neighboring cell that does not support in-vehicle emergency calls, and wherein the adjusted selection value, with respect to the selection value, decreases a priority of the neighboring cell for selection.

22. The wireless device of claim 18, wherein the cell is a serving cell that supports in-vehicle emergency calls, and wherein the adjusted selection value, with respect to the selection value, increases a probability of the wireless device remaining camped on the serving cell.

23. The wireless device of claim 18, wherein the cell is a serving cell that does not support in-vehicle emergency calls, and wherein the adjusted selection value, with respect to the selection value, decreases a probability of the wireless device remaining camped on the serving cell.

24. The wireless device of claim 18, wherein the cell is a serving cell that supports in-vehicle emergency calls, and wherein the memory and the one or more processors are configured to adjust, based at least in part on the offset, a threshold for initiating measurement of neighboring cells, the offset being set to increase an amount of time before initiating measurement of the neighboring cells.

25. The wireless device of claim 18, wherein the cell is a serving cell that does not support in-vehicle emergency calls, and wherein the memory and the one or more processors configured to adjust, based at least in part on the offset, a threshold for initiating measurement of neighboring cells, the offset being set to decrease an amount of time before initiating measurement of neighboring cells.

26. A network device for wireless communication, comprising:
  a memory; and
  one or more processors operatively coupled to the memory, the memory and the one or more processors configured to:
    determine an offset in order to one or more of:
      increase a priority, for selection by a wireless device, of a cell that supports in-vehicle emergency calls, or
      adjust a threshold for initiating measurement of neighboring cells based at least in part on whether a serving cell supports in-vehicle emergency calls; and
    provide the offset to the wireless device.

27. The network device of claim 26, wherein the network device is a base station that provides a serving cell that supports in-vehicle emergency calls, and wherein the memory and the one or more processors are configured to cause the wireless device to reselect from the serving cell to a neighbor cell that does not support in-vehicle emergency calls, based at least in part on a determination that a difference between a selection value of the serving cell and a selection value of the neighbor cell satisfies a reselection threshold.

28. The network device of claim 26, wherein the network device is a base station that provides a serving cell that does not support in-vehicle emergency calls, and wherein the memory and the one or more processors are configured to cause the wireless device to reselect from the serving cell to a neighbor cell that supports in-vehicle emergency calls, based at least in part on a determination that a difference between a selection value of the serving cell and a selection value of the neighboring cell satisfies a reselection threshold.

29. The network device of claim 26, wherein the network device is a base station that provides a serving cell that supports in-vehicle emergency calls, and wherein the memory and the one or more processors are configured to hand over the wireless device from the serving cell to a neighboring cell that does not support in-vehicle emergency calls, based at least in part on a determination that a difference between a selection value of the serving cell and a selection value of the neighbor cell satisfies a handover threshold.

30. The network device of claim 26, wherein the network device is a base station that provides a serving cell that does not support in-vehicle emergency calls, and wherein the memory and the one or more processors are configured to hand over the wireless device from the serving cell to a neighboring cell that supports in-vehicle emergency calls, based at least in part on a determination that a difference between a selection value of the serving cell and a selection value of the neighbor cell satisfies a handover threshold.

* * * * *